Figure 1:
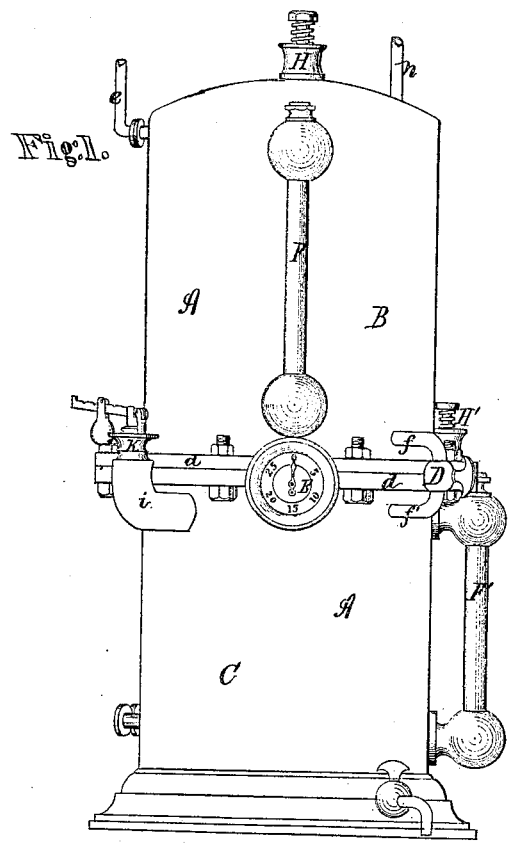

2 Sheets, Sheet 1.

G. Clarkson,
Alcohol Still.

No. 111,609.   Patented Feb. 7, 1871.

Witnesses.
Cha. Kenyon.
Villette Anderson,

Inventor.
G. Clarkson
Chipman Hosmer & Co
Att'ys,

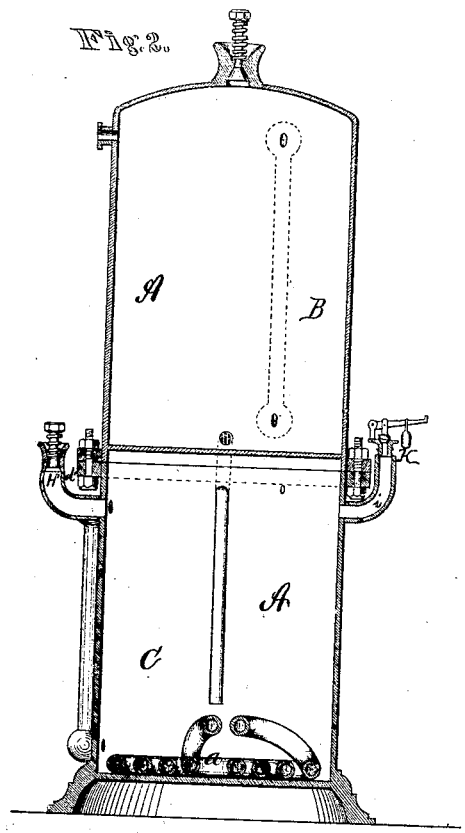
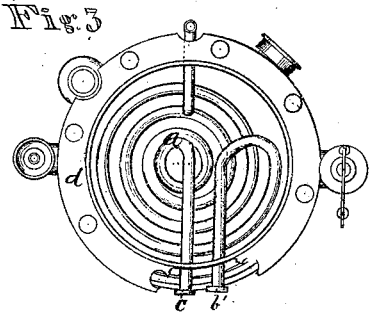

United States Patent Office.

GEORGE CLARKSON, OF ELGIN, ILLINOIS, ASSIGNOR TO HIMSELF, SAMUEL D. WILDER, AND ALBERT SHERWIN, OF SAME PLACE.

Letters Patent No. 111,609, dated February 7, 1871.

IMPROVEMENT IN ALCOHOL-STILLS.

The Schedule referred to in these Letters Patent and making part of the same.

Be it known that I, GEORGE CLARKSON, of the city of Elgin, in the county of Kane in the State of Illinois, have invented a new and useful Machine and Apparatus for the Manufacture of Alcohol by process of continuous distillation from the mash or grain, and for the prevention of frauds upon the revenue in the manufacture of distilled spirits, entitled "Clarkson's Continuous Alcohol-Still;" and I do hereby declare that the following is a full, clear, and exact description of the construction and operation of the same, reference being had to the annexed drawing.

Figure 1 is a side elevation of my invention.
Figure 2 is a vertical central section.
Figure 3 is a detail showing the worm.

A represents a receiver of cylindrical shape. It is divided into unequal portions by a diaphragm, and near the center are openings for allowing the two portions to communicate by means of a pipe.

The lower portion contains a steam-coil, $a$, commencing at $b'$ and terminating at $c$.

These sections or portions are provided with flanges $d$, which are secured together by bolts and nuts.

The receiver is attached to the worm of a grain-still by means of the pipe $e$, which receives the high-wines to be distilled from the tub, and passes the same through the chamber B and regulating-faucet D to the lower chamber C.

The office of the faucet D is to regulate the necessary flow of wines from the chamber B to chamber C through the pipes $f$.

The wines, being thus introduced into the lower chamber, are subjected to a steam pressure from the steam-pipe $b$ in the coil $a$ sufficient to counterbalance the pressure in the alcohol-still.

The pressure is governed by the steam-gauge E, as shown in the drawing. This steam-gauge is secured to the upper end of chamber C.

The steam is let into the chamber at $b'$, passing through the coil $a$, from whence it passes off through the pipe $c$.

The wine is thus exposed to the action of the steam constantly passing through the coil in chamber C, and in this manner its alcohol is abstracted.

When the alcohol has been separated from the high-wines in the reservoir, the residuum is carried through the pipe $h$.

F F' represent glass gauge-tubes, secured at their ends upon the sides of the chambers B and C, to show the altitude of the fluid in each chamber.

H H' represent ordinary steam-valves, secured to the chambers B and C, as shown in the drawing, to let off the surplus steam, when the steam-gauge on chamber C, indicates a higher pressure than is shown by the steam-gauge on the alcohol-still vacuum.

K represents a safety-valve attached to chamber C, as shown on the drawing at $i$. The object of this valve is to avoid excessive pressure of steam in said chamber.

The operation of my device is as follows:

The high-wine as it descends from the worm accumulates in the upper chamber B until that chamber becomes nearly filled, which, when the attendant perceives by inspection of the glass tubes, he opens the regulating-faucet D of the pipe $e$ and discharges the contents into the lower chamber C, then shutting the valve, when the wine again accumulates in B, and when it is a second time nearly full, the contents of the lower chamber C are discharged through the lower cock and pipe, and again the charge in the chamber B is let down, and thus the process goes on.

What I claim as new, and desire to secure by Letters Patent, is—

1. The still herein described, having compartments B and C, constructed and arranged substantially as specified.

2. In combination with a double-chambered still, the pipes $e$, $h$, and $f$, valve K, and regulating-faucet D, substantially as specified.

3. The coiled pipe $a$, induction-pipe $b$ and eduction-pipe $c$, in combination with the double-chambered still, substantially as specified.

4. In combination with a double-chambered still constructed for continuous distillation, the glass gauges F and F', constructed and arranged substantially as described.

Witnesses:
E. C. LOVELL,
J. N. RUNSTEAD.

GEORGE CLARKSON.